Patented Apr. 28, 1936

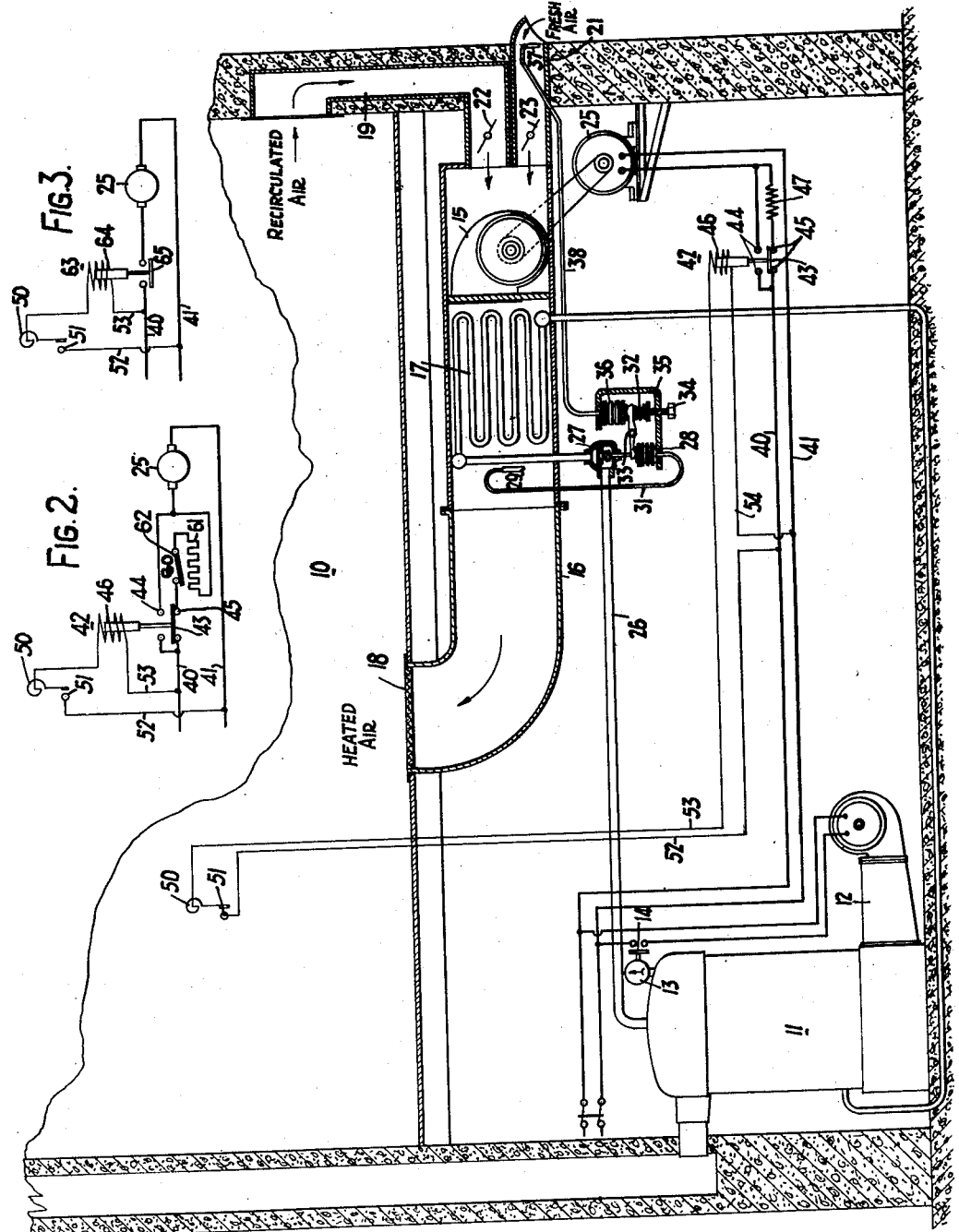

2,038,578

UNITED STATES PATENT OFFICE 2,038,578

AIR CONDITIONING APPARATUS

John F. Lamb, Pittsburgh, Pa., assignor to Westinghouse Electric & Manufacturing Company, East Pittsburgh, Pa., a corporation of Pennsylvania Application January 20, 1934, Serial No. 707,539

5 Claims. (Cl. 237—2)

My invention relates to heating systems and it has for an object to provide an improved method and apparatus for heating the air in an enclosure.

A futher object of my invention is to provide an improved system which controls the temperature and volume of air conveyed to an enclosure.

A further object is to provide an improved heating system for an enclosure, in which sufficient circulation of air for ventilation is provided without excessive delivery of heat to the enclosure in mild weather.

A still further object of my invention is to provide a system which controls the temperature of the air delivered to an enclosure in accordance with the outside temperature and the volume of air delivered in accordance with the temperature of the enclosure.

An additional object of my invention is to provide a hot air heating system in which a volume of air of a predetermined temperature is circulated at all times for ventilation, which volume is increased in response to a demand for heat.

In the operation of hot air heating systems for enclosures in which people congregate, it is desirable that the temperature of the air in the enclosure be maintained substantially at some constant predetermined degree and that relatively large temperature overruns above or below this degree be prevented. It is also desirable that the temperature of the air supplied to the enclosure be varied inversely with the temperature of the outside atmosphere to compensate for changes in heat leakage which accompany changes in outside temperature. Furthermore, it is desirable that the frequency of operation of the room thermostat be maintained at a minimum. These features will be found in my improved heating system.

In practicing my invention, I provide a heater, a blower for translating air in heat exchanging relation with said heater and delivering it to the enclosure, and also a duct, when required, for conveying the heated air from the heater to the enclosure. The heater is preferably regulated to maintain a predetermined temperature of the air leaving the heater, which predetermined temperature is varied in accordance with the temperature of the outside air. For example, a heater supplied with heating medium of substantially constant pressure or temperature may be used and the supply of heating medium to the heater regulated to maintain said predetermined temperature.

The supply of heat to the enclosure is controlled in accordance with the temperature of the air in the enclosure. When a demand for heat exists, air, heated to said predetermined temperature, is delivered to the enclosure at a predetermined rate and when the demand is satisfied, the rate of air delivery is reduced.

I prefer to vary the rate at which heated air is delivered to the enclosure by adjusting the speed of the blower. Therefore, when the thermostat in the enclosure calls for heat, the blower operates at relatively high speed and heater air is delivered to the enclosure at a relatively high rate. When the demand for heat is satisfied, the blower may be stopped, or it may be operated, continuously or intermittently, at a lower speed for delivering air at a lower rate to the enclosure to provide for ventilation at such time. It will be seen from the foregoing that a predetermined volume of air, at a temperature determined by outside air temperature, is circulated at times when the thermostat in the enclosure calls for heat and that the volume of air is decreased when the thermostat is satisfied.

These and other objects are effected by my invention, as will be apparent from the following description and claims taken in connection with the accompanying drawing, forming a part of this application, in which:

Figure 1 is a diagrammatic view of apparatus embodying my invention; and

Figures 2 and 3 are modified diagrams of electrical connections for the apparatus of Figure 1.

In Fig. 1 of the drawing, I show my improved system applied to an enclosure 10 which, it will be understood, comprises either one or more rooms. The source of heating medium includes a boiler 11 which is heated in any suitable manner such as, for example, an oil burner 12 of conventional construction. The operation of the burner 12 is controlled in response to a temperature condition within the boiler. In the illustrated embodiment, I use steam as the heating medium and therefore a pressure device 13 is used to start and stop the burner 12 in response to steam pressure. Where water is used as the heating medium, it will be understood that the pressure device 13 is supplanted by a thermostat which responds to the temperature of the water. The pressure device 13 is of well known construction and no detail description of it is deemed necessary. However, it operates to open a switch 14 when the steam pressure in the boiler is above a predetermined value and closes the switch 14 when the pressure drops slightly below said value, thereby effecting a substantially constant pressure, and consequently substantially constant temperature, of the steam generated by the boiler.

Air is translated by a blower or fan 15 through a duct structure 16 and passes in heat exchanging relation with a heater 17 disposed within the duct structure 16, before being discharged through an opening 18 to the enclosure 10. A plurality of inlet conduits 19 and 21 communicate with the duct 16 and lead, respectively, to the enclosure 10 and the outside atmosphere. Dampers 22 and 23 are preferably arranged within the conduits 19 and 21 for proportioning the respective amounts of recirculated and fresh air, which are drawn in by the blower 15.

The heater 17 is supplied with steam from the boiler 11 through a conduit 26 having a thermostatically-operated valve 27 connected therein. The latter is preferably operated by an expansible bellows 28 which communicates with a thermostatic bulb 29 by means of a tube 31. Expansion of the bellows 28 is opposed by the bias of a compression spring 32 which may be connected to the bellows by a pivoted lever 33. The bias of the spring 32 may be adjusted by a screw 34 which supports one end of the spring 33 and which is screwed into a fixed member 35. A second bellows 36, communicating with a thermostatic bulb 37 by means of a tube 38, is provided to modify the action of the bellows 28 in accordance with the outside temperature and is arranged to assist the bellows 28 in opposing the spring 32. Both bellows 28 and 36 and their associated bulbs and tubes define closed chambers within which an expansible and, preferably, volatile fluid is contained. The pressure of the gas within the bellows 28 or 36 varies directly with the temperature of its respective bulb, as is well understood.

The bulbs 29 and 37 are disposed, respectively, on the down stream side of the heater 17 and in the outside atmosphere. The bulb 29 and bellows 28 operate to maintain a constant temperature of air discharged by the heater 17 with a given outside temperature. The temperature to be maintained for a given outside temperature may be adjusted by rotating the screw 34 to vary the bias of the spring 32. It will be seen that, if the temperature of the air discharged from the heater 17 rises above a predetermined value, as determined by the adjustment of the spring 32 and the outside temperature, the pressure within the bulb 29 and bellows 28 increases and the valve 27 is moved in a closing direction. The supply of steam to the heater 17 is therefore diminished and further increase in temperature of the heated air is restricted.

The purpose of the thermostatic bellows 36 is to change the temperature of the air discharged by the heater 17 inversely as the outside temperature. When the temperature of the outside air rises, the pressure within the bulb 37 and bellows 36 increases, so that the bellows 36 assists the bellows 28 to a greater degree in overcoming the bias of the spring 32. The valve 27 is therefore moved in a closing direction to reduce the supply of steam conveyed to the heater 17, and the temperature of the air discharged by the heater 17 is lower than before the change in the temperature of the outside atmosphere. Conversely, when the temperature of the outside atmosphere is depressed, the temperature of the air discharged by the heater 17 is increased. This is brought about by the drop in pressure in the bellows 36, which reduces the assistance rendered by it to the bellows 28. The bias of the spring 32 therefore moves the valve 27 in an opening direction to admit more steam to the heater 17. In other words, the bellows 36 modifies the action of the bellows 28 so as to maintain a lower temperature of the heated air when the outside temperature increases, and vice versa.

As the volume of air delivered to the enclosure 10 is to be varied at times, means are provided for operating the blower at varying speeds. A variable speed motor 25 is preferably used for driving the blower. The motor 25 is energized by means of conductors 40 and 41 which lead to a source of power (not shown).

The speed of the motor 25 may be varied in any well known manner, for example, by adjusting its terminal voltage. This may be accomplished by means of a relay 42 having a switching member 43 which engages, alternately, contacts 44 and 45. The switching member 43 is actuated by a solenoid 46. The contacts 44 when bridged by the member 43 connect the motor 25 directly to the conductor 40 so that full voltage is impressed on the motor 25 for full speed operation. When the member 43 bridges the contacts 45, the motor is connected to the conductor 40 through a resistor 47 so that a reduced potential is impressed on the motor 25 and it operates at a reduced speed.

Energization of the solenoid 46 is controlled by a thermostat 50, so disposed that changes in temperature of the air in the enclosure 10 are readily reflected therein. The thermostat 50 is of any well known construction and operates to close the contacts 51 when the temperature of the air in the enclosure 10 is below a predetermined degree and to open the contacts 51 when above said predetermined degree.

Having described the various elements of my improved heating system, the operation will now be given. The dampers 22 and 23 are manually set to provide for the proper mixture of fresh and recirculated air to be delivered to the enclosure 10. The adjusting screw 34 is adjusted to the temperature at which the air conveyed to the enclosure is to be maintained with the existing or a given outdoor temperature. The pressure switch 13 is adjusted to maintain a predetermined steam pressure.

Assume the apparatus to be in the position shown in the drawing. The switch 51 is open as the temperature of the air in the enclosure 10 is above the degree to be maintained. The solenoid 46 is therefore deenergized as the circuit, including the conductor 40, conductor 52, switch 51, conductor 53, solenoid 46, conductor 54 and conductor 41, is open at 51. As the solenoid 46 is deenergized, the switching member 43 engages contacts 45 so that the motor 25 is connected across conductors 40 and 41 through the resistor 47. The motor 25 operates at low speed and the blower or fan 15 draws air from the enclosure 10 through the conduit 19 and fresh air from the outside atmosphere through the conduit 21. The recirculated and fresh air commingle and the mixture is then forced in heat exchanging relation with the heater 17 where it is heated, before passing through the outlet 18 to the enclosure 10. The low speed operation of the fan provides sufficient circulation of air for ventilation and also effects some heating.

As the temperature of the air in the enclosure 10 drops to a predetermined degree, the switch 51 is closed by the thermostat 50 and the circuit previously traced is closed at 51. The solenoid 46 is therefore energized and the switching member 43 is raised to bridge contacts 44. The resistor is open circuited and the conductor 40 connected directly to the motor 25 which operates at high speed. The blower circulates a relatively large volume of heated air to the enclosure 10 until the temperature of the air attains the predetermined temperature at which the thermostatic switch 51 opens.

During this operation, it will be understood that the temperature of the air delivered to the enclosure through the opening 18 is maintained within close limits by means of the thermostat 29, which limits are determined by the outside temperature. The supply of steam for the heater 17 is maintained by the burner 12 under control of the pressure device 13. The latter operates to close the switch 14 for initiating operation of the burner 12 when the pressure of steam in the boiler falls below a predetermined value and to open the switch 14 when the pressure is somewhat above said value.

From the foregoing, it will be seen that, during periods when the thermostat is satisfied, air at a predetermined temperature is supplied to the enclosure 10 at a relatively low rate. The heat delivered to the enclosure 10 at this time will partly compensate for the loss of heat from the enclosure, so that the time interval between the opening of the thermostatic switch 51, when satisfied, and the closing thereof, when calling for heat, is increased. When switch 51 closes to call for more heat, the increase in rate of delivery of heat to the room is increased by increasing the volume of air delivered to the enclosure, the temperature of the air being substantially the same as at the time of low rate of delivery.

It will also be apparent that temperature overruns are substantially reduced. Decreases in temperature beyond the temperature at which the thermostat closes are avoided as the heater 17 is heated during substantially the entire period that the system is operative, and, when the thermostat calls for heat, the fan immediately operates to deliver it at such a rate that the temperature of the enclosure begins to rise immediately. Increase in temperature beyond the temperature at which the thermostat opens are avoided as the rate of delivery of heat is immediately reduced when the thermostat opens to the amount which partly compensates for the heat loss from the enclosure.

Reference will now be had to Fig. 2 which shows a modified electrical circuit for the blower motor 25 of Fig. 1. In this embodiment the motor 25 is intermittently operated at times when the thermostat 50 is open and the blower 15 therefore operates to circulate heated air intermittently during these periods. Sufficient ventilation is therefore provided to prevent the occurrence of stagnant pockets of air, and heat is supplied to the enclosure for the purposes discussed in connection with the first embodiment. A power saving is effected by operating the motor intermittently.

The electrical connections to the motor 25 are similar to those of Fig. 1 except that a timing device 60 is included in its low speed connection. The device 60 includes a resistor 61 and a thermally operated switch 62 which is subjected to the heat of the resistor 61. The thermostat 50 in Fig. 2 is shown with its contacts 51 open and the relay solenoid 46 is deenergized so that the bridging member 43 is in engagement with contacts 45. A circuit is therefore completed from line conductor 40, contacts 45 which are bridged by member 43, switch 62, resistor 61, motor 25 to the line conductor 41. The terminal voltage of the motor 25 is relatively low due to the voltage drop across the resistor 61, and it operates at low speed to drive the blower 15. Heated air is circulated by the latter through the enclosure 10 at a low rate.

The thermally operated switch 62 is gradually heated by the resistor 61 and opens, after a predetermined period of time, to stop the motor 25, and circulation of air by the blower 15 ceases. After the resistor 61 and switch 62 cool, the latter closes to energize the motor 25, through the resistor 61. Circulation of heated air is again effected. This cycle continues as long as the thermostat 50 maintains its contacts 51 open. When the latter closes due to a demand for heat, the motor 25 is connected directly to the conductors 40—41 in the same manner as described in connection with Fig. 1. Full voltage is impressed on the motor 25 which operates to drive the blower 15 at high speed and heated air at a high rate is supplied to the enclosure 10.

In both of the embodiments described above, it will be seen that when the thermostat 50 calls for heat, the system functions to deliver heated air at a relatively high rate to the enclosure 10 and that when the demand for heat is satisfied, the heated air is delivered at a lower rate for ventilation. Furthermore, the heat delivered to the enclosure 10 during periods when the thermostat is satisfied, partly compensates for the heat loss from the enclosure and therefore extends the time that the thermostat will again call for heat.

In Fig. 3, the motor 25 operates at full speed to drive the blower 15 during periods when the thermostat 50 is calling for heat and is stopped when the thermostat 50 is satisfied. A relay 63 having a solenoid 64 for operating contacts 65 is provided for controlling the operation of the motor 25. When the thermostat 50 is calling for heat the motor is energized in the same manner as described heretofore for high speed operation. When the thermostat 50 is satisfied however, the deenergized solenoid 64 opens the switch 65 and the motor stops.

In the latter embodiment, forced circulation of heated air is not effected when the thermostat 50 is open. Only such heating and ventilation of the enclosure 10 are provided at this time as are due to the convection currents induced by the heater 17.

While I have shown my invention in but three forms, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The method of heating an enclosure which comprises heating air to a predetermined temperature, varying said predetermined temperature in accordance with the temperature of the outside atmosphere, delivering the heated air at a predetermined rate to said enclosure in response to a demand for heat thereby and delivering the heated air, intermittently, at a reduced rate when the demand for heat is satisfied.

2. In a heating system for an enclosure the combination of means for heating air to a predetermined temperature, means for varying said predetermined temperature in response to the outside temperature, means responsive to a predetermined maximum temperature of the air in the enclosure for supplying said heated air to the enclosure intermittently and at a predetermined rate and means responsive to a predetermined minimum temperature of the air in said enclosure for supplying the heated air continuously and at an increased rate.

3. In a heating system for an enclosure, the combination of means for heating air, means for circulating air from said enclosure to the heating means and delivering the heated air to the enclosure, means responsive to the temperature of the heated air for controlling the supply of heating medium to said heating means to maintain a predetermined temperature of said heated air, means responsive to increase in temperature of the outside atmosphere for modifying the action of said temperature responsive means to decrease said predetermined temperature and vice versa, and means responsive to the demand for heating in the enclosure and controlling said air circulating means so as to effect a relatively high rate of air circulation in response to demand for heat and to effect a lower rate of air circulation when the demand is satisfied, said lower rate of air circulation being sufficient to provide ventilation of the enclosure and a delivery of heat that partly compensates for loss of heat from the enclosure.

4. In a heating system for an enclosure, the combination of means for heating air, means for circulating air from said enclosure to said heating means and for delivering the heated air to the enclosure, said circulating means including a fan, a motor having a high speed and a low speed for driving said fan, means for controlling the supply of heating medium to the heating means in accordance with the temperature of the heated air and operating to maintain a predetermined temperature thereof, means responsive to increase in temperature of the outside atmosphere for decreasing said predetermined temperature and vice versa, and means for effecting operation of said motor and fan at high speed in response to a predetermined minimum value of the temperature of the air in the enclosure and for effecting operation thereof at low speed when said temperature is above a predetermined value, said low speed providing a rate of air circulation sufficient for ventilation of the enclosure and which partly compensates for loss of heat from the enclosure.

5. In a heating system for an enclosure, the combination of means for withdrawing air from the enclosure, adding outdoor air thereto, and delivering the air to the enclosure, means for increasing the temperature of the air before delivery to the enclosure, means for controlling said temperature increasing means in response to the temperature of the air delivered to the enclosure and operating to maintain a predetermined value thereof, means responsive to increase in temperature of the outside atmosphere for modifying the action of said temperature-responsive means to decrease said predetermined value and vice versa, and means for controlling the first-mentioned means so as to effect a relatively high rate of air delivery to the enclosure in response to a predetermined minimum temperature in the enclosure and to effect a lower rate of air delivery in response to a predetermined maximum temperature in the enclosure, said lower rate of air delivery providing sufficient movement of air for ventilation of the enclosure and a delivery of heat that partly compensates for loss of heat from the enclosure.

JOHN F. LAMB.